United States Patent
Stocq et al.

(10) Patent No.: US 6,270,887 B1
(45) Date of Patent: Aug. 7, 2001

(54) BREATHABLE FILM COVER FOR WINDOW STRUCTURES

(75) Inventors: Robert G. Stocq, Bernissart; Claude Pasti, Ecassinnes, both of (BE)

(73) Assignee: Morgan Adhesives Company, Stow, OH (US)

(*) Notice: Subject to any disclaimer, the term of this patent is extended or adjusted under 35 U.S.C. 154(b) by 0 days.

(21) Appl. No.: 09/253,189

(22) Filed: Feb. 19, 1999

Related U.S. Application Data

(60) Provisional application No. 60/075,748, filed on Feb. 23, 1998.

(51) Int. Cl.[7] .................................................. B32B 7/12
(52) U.S. Cl. ......................... 428/344; 428/354; 428/412; 428/461; 428/463; 428/522
(58) Field of Search ..................................... 428/344, 354, 428/343, 412, 457, 461, 463, 522

(56) References Cited

U.S. PATENT DOCUMENTS

| | | | |
|---|---|---|---|
| 4,361,625 | * 11/1982 | Beckmann et al. | 428/412 |
| 4,550,058 | * 10/1985 | Collins et al. | 428/412 |
| 5,258,232 | * 11/1993 | Summers et al. | 428/463 |
| 5,861,211 | * 1/1999 | Thakkar et al. | 428/343 |

* cited by examiner

*Primary Examiner*—Daniel Zirker
(74) *Attorney, Agent, or Firm*—Renner, Kenner, Greive, Bobak, Taylor & Web

(57) ABSTRACT

A breathable film cover for transparent plastic plates employed as windows and the like. A metalized plasticized polyvinyl chloride film is adhesively laminated to a polycarbonate or polyacrylate plate by means of an adhesive having a UV absorber. The plasticized PVC film allows for the escape of moisture emanating as a result of degasification of the polycarbonate or polyacrylate plates. The permeability of the PVC or polyvinyl chloride film to moisture allows the metalized plasticized polyvinyl chloride film to remain adhered to the plates without bubbles, craters or tunnels.

12 Claims, 1 Drawing Sheet

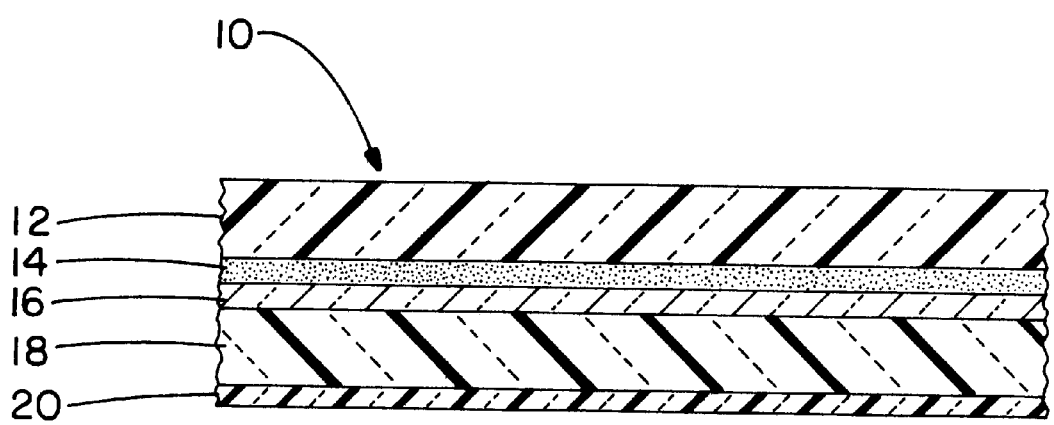

BREATHABLE FILM COVER FOR WINDOW STRUCTURES

This application claims benefit to U.S. provisional application Ser. No. 60/075,748, filed Feb. 23, 1998.

TECHNICAL FIELD

The invention herein resides in the art of film covers for window plates. More particularly, the invention relates to a light reflective and ultraviolet absorptive film cover for windows. Specifically, the invention pertains to a breathable film cover for polycarbonate or polyacrylate plate windows exhibiting light reflective and/or ultraviolet absorptive characteristics.

BACKGROUND ART

It is well known in the art to employ metalized polymeric films to cover glass plates in window structures. Typically, these films are employed to filter ultraviolet (UV) light and/or to reflect light from the window plate. Typically, the polymeric film is one of polyester, polyethylene, polypropylene or the like. While such film covers have proven to be effective in the past for covering and filtering/reflecting light from glass panels, there are materials other than glass which are presently being used for window panels and panes. Presently, plastic material such as polycarbonate and polyacrylate are being used as the primary window structure. These materials are strong, light weight, shatter proof and of high clarity, serving well for window structures, and particularly in skylights, verandas, sun rooms, and the like.

It has been found that when the prior art metalized polymeric films are attached to polycarbonate or polyacrylate plates, problems develop. Specifically, bubbles, craters, or tunneling appears when the metalized film is applied to such plastic plates. It has come to be found that plastic plates such as those of polycarbonate and polyacrylate contain moisture that creates such defects at the interface of the adhesive and the plate when the plate loses its inherent moisture. The moisture escape is termed degasification. These defects appear because the polymeric film used for such applications is impervious to moisture, providing an excellent barrier against moisture transfer. Being impermeable to the escaping moisture, the objectionable bubbles, craters and tunnels develop at the interface between the film and the plastic plate.

In view of the fact that it is desirable to employ polycarbonate and polyacrylate plates for certain window structures, and in further view of the fact that such window structures often require the implementation of reflective and/or filtering films, there is a need in the art for a metalized polymeric film which is breathable and capable of adhering to polycarbonate and polyacrylate plates without the development of bubbles, craters or tunnels as a result of degasification of the plate material.

DISCLOSURE OF INVENTION

In light of the foregoing, it is a first aspect of the invention to provide a breathable film cover for window structures.

It is another aspect of the invention to present a breathable film cover for window structures which is particularly adapted for implementation with polycarbonate and polyacrylate plates.

Still a further aspect of the invention is the provision of a breathable film cover for window structures having light reflective and filtering capabilities.

Yet an additional aspect of the invention is the provision of a breathable film cover for window structures which is efficient, effective, and conducive to implementation with state of the art materials.

The foregoing, and other aspects of the invention which will become apparent as the detailed description proceeds are attained by the implementation of a plasticized polyvinyl chloride film having a metalized coating thereon and adhesively attached to a polycarbonate or polyacrylate plate by means of an ultraviolet absorptive adhesive.

BRIEF DESCRIPTION OF THE DRAWING

For a complete understanding of the objects, techniques and structure of the invention reference should be made to the following detailed description and accompanying drawing wherein a cross-sectional view of a window structure of polycarbonate or polyacrylate is shown with a breathable film cover adhered thereto in accordance with the invention

BEST MODE FOR CARRYING OUT THE INVENTION

Referring now to the drawing, it can be seen that a window structure manufactured in accordance with the invention is designated generally by the numeral 10. The window 10 includes a plate 12 of polycarbonate or polyacrylate, defining the window pane or transparent portion. The plate 12 receives a metalized plasticized polyvinyl chloride (PVC) film thereover. As shown in the drawing, the plasticized PVC film 18 has a metalization coating 16 adhered to an inner surface thereof, which in turn receives an adhesive layer 14 adapted for securing engaging with the plate 12. According to the preferred embodiment of the invention, the adhesive 14 includes a UV absorber. An anti-scratch/anti-static coating 20 is provided over the plasticized PVC film 18.

It will be appreciated that in accordance with the invention, the composite 14–20 is adhesively secured to the plate 12 on the interior of the building for which the plate 12 serves as a window or transparent structure. Accordingly, the anti-scratch/anti-static coating 20 is at the innermost portion of the window structure 10 when employed in a building.

In accordance with the invention, the polymeric plasticized PVC film 18 is a clear stabilized film and the adhesive 14 is an acrylic adhesive which may be either permanent or removable, in either case containing a UV absorber. A suitable PVC film is MACal 9899 manufactured by Morgan Adhesives Company. A suitable removable adhesive is MR 983, both of which are solution acrylic pressure sensitive adhesives of Morgan Adhesives Company, and permanent adhesive is MP 319, each of which would be provided with 3 percent TINUVIN, manufactured by Ciba-Geigy, as a UV absorber. Those skilled in the art will understand that TINUVIN is a liquid benzotriazole type of ultraviolet absorber that imparts good light stability to a variety of polymers during use.

The plasticized PVC film 18, even with the metalization coating 16, is permeable with respect to water and, accordingly, any moisture escaping from the polycarbonate or polyacrylate plate 12 will simply pass through the adhesive 14, metalization coating 16, and coating 20 to the atmosphere. Accordingly, bubbles, craters, and tunnels are eliminated and the laminate 14–20 presents a light shield and filter for polycarbonate and polyacrylate plates which is as secure and attractive as the predecessor films of polyester, polyethylene and polypropylene for glass.

Thus it can be seen that the objects of the invention have been satisfied by the structure presented above. While it is contemplated that various modifications, enhancements and adaptations may be made of the invention, it is to be understood that the scope and breadth of the invention is that defined by the claims.

What is claimed is:

1. A film cover for window plates that are characterized by degasification, comprising:

a plasticized polyvinyl chloride film, a metalization coating adhered to said plasticized polyvinyl chloride film on one side thereof;

an adhesive layer engaging the surface of said metalization coating that is not adhered to said plasticized polyvinyl chloride; and wherein said plasticized polyvinyl chloride film, said metalization coating and said adhesive layer are permeable to moisture escaping by degasification from the window.

2. A film cover for window plates according to claim 1 wherein said polyvinylchloride film is a clear stabilized film.

3. A film cover for window plates according to claim 1 wherein said adhesive layer contains an ultraviolet light absorber.

4. A film cover for window plates according to claim 2 wherein said ultraviolet light absorber is provided by said adhesive layer comprising about 3% of a liquid benzotriazole ultraviolet absorber.

5. A film cover for window plates according to claim 3 wherein said adhesive layer is of a removable adhesive.

6. A film cover for window plates according to claim 3 wherein said adhesive layer is of a permanent adhesive.

7. A film cover for window plates according to claim 1 further comprising an anti-scratch and anti-static coating provided over said plasticized polyvinylchloride film on the side thereof not adhered to said metalization coating.

8. A film cover for window plates according to claim 7 wherein said anti-scratch and anti-static coating is permeable to moisture escaping by degasification from the window.

9. A window structure, comprising:

a polycarbonate plate;

a plasticized polyvinyl chloride film;

a metalization coating adhered to said plasticized polyvinyl chloride film on one side thereof;

an adhesive interposed between said polycarbonate plate and said metalization coating for securing said plasticized polyvinyl chloride film having said metalization coating thereon to said polycarbonate plate; and wherein said plasticized polyvinyl film, said metalization coating and said adhesive are permeable to moisture escaping from said polycarbonate plate.

10. The window structure according to claim 9, wherein said adhesive has a UV absorber.

11. A window structure, comprising:

a polyacrylate plate;

a plasticized polyvinyl chloride film;

a metalization coating adhered to said plasticized polyvinyl chloride film on one side thereof;

an adhesive interposed between said polyacrylate plate and said metalization coating for securing said plasticized polyvinyl chloride film having said metalization coating thereon to said polycarbonate plate; and wherein said plasticized polyvinyl film, said metalization coating and said adhesive are permeable to moisture escaping from said polyacrylate plate.

12. The window structure according to claim 11, wherein said adhesive has a UV absorber.

* * * * *